(12) United States Patent
Lambert et al.

(10) Patent No.: US 7,904,706 B2
(45) Date of Patent: Mar. 8, 2011

(54) SYSTEM AND METHOD FOR PROCESSING ENCRYPTED SOURCE CODE UPDATES

(75) Inventors: Mark J. Lambert, Greenville, TX (US); David Anthony Norman, Greenville, TX (US)

(73) Assignee: Innovation First, Inc., Greenville, TX (US)

( * ) Notice: Subject to any disclaimer, the term of this patent is extended or adjusted under 35 U.S.C. 154(b) by 1414 days.

(21) Appl. No.: 11/290,158

(22) Filed: Nov. 30, 2005

(65) Prior Publication Data
US 2006/0129846 A1 Jun. 15, 2006

Related U.S. Application Data

(60) Provisional application No. 60/632,188, filed on Dec. 1, 2004.

(51) Int. Cl.
*G06F 21/00* (2006.01)

(52) U.S. Cl. .......... 713/1; 713/2; 713/100; 713/189; 713/191; 713/194

(58) Field of Classification Search ............ 717/121, 717/173; 713/1, 2, 100, 194, 189, 191; 380/28; 700/1, 245
See application file for complete search history.

(56) References Cited

U.S. PATENT DOCUMENTS

| | | | |
|---|---|---|---|
| 5,539,891 A | 7/1996 | Childers et al. | |
| 5,572,809 A | 11/1996 | Steenwyk et al. | |
| 5,664,195 A | 9/1997 | Chatterji | |
| 5,933,498 A | 8/1999 | Schneck et al. | |
| 6,408,226 B1 | 6/2002 | Byrne et al. | |
| 6,484,083 B1 | 11/2002 | Hayward et al. | |
| 6,486,725 B2 | 11/2002 | Boggs et al. | |
| 6,674,259 B1 | 1/2004 | Norman et al. | |
| 6,983,364 B2 * | 1/2006 | Gougeon | 713/2 |
| 2002/0100035 A1 | 7/2002 | Kenyon et al. | |
| 2004/0073846 A1 * | 4/2004 | Nakanishi et al. | 714/42 |
| 2004/0107237 A1 | 6/2004 | Kashiwada | |
| 2006/0048221 A1 | 3/2006 | Morais et al. | |

OTHER PUBLICATIONS

Microsoft WindowsXP: "Using Windows Professional With Service Pack 2 in a Managed Environment: Controlling Communication With The Internet," Microsoft Corp. Publisher, Jul. 2004., pp. 161-162.*

International Preliminary Report on Patentability, PCT/US2005/043287, mailed Jun. 14, 2007, 8 pages.

Notification of Transmittal of the International Search Report and the Written Opinion of the International Searching Authority, the International Search Report, and the Written Opinion, Forms PCT/ISA/220, PCT/ISA/210, and PCT/ISA/237, mailed Apr. 24, 2006, 11 pages.

* cited by examiner

*Primary Examiner* — Matthew B Smithers
*Assistant Examiner* — Paul Callahan
(74) *Attorney, Agent, or Firm* — Fish & Richardson P.C.

(57) ABSTRACT

This disclosure provides a system and method for updating a control system using an encrypted source code update. The example control system often includes a processor for managing at least a portion of the control system and flash memory communicably coupled with the processor, with the processor operable to load an encrypted update into the flash memory. In one example, a method for updating the control system would include identifying an update for a control system with the update comprising encrypted object code and the control system comprising at least a first processor. At least the first processor is then updated based on or using the identified update.

22 Claims, 5 Drawing Sheets

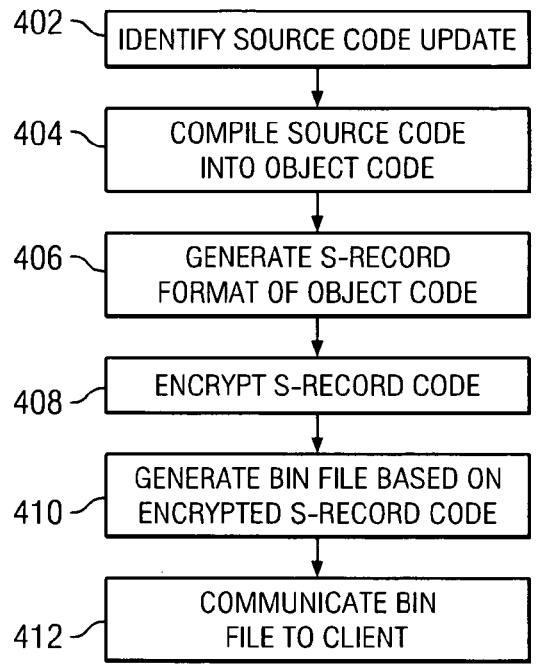
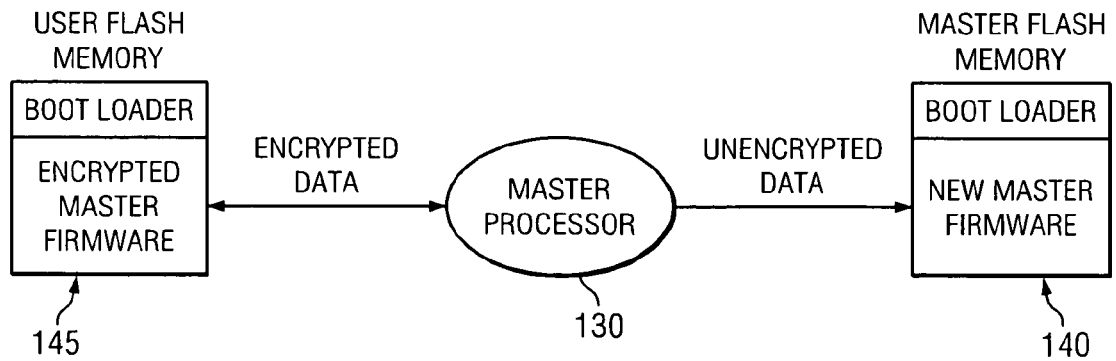

SYSTEM AND METHOD FOR PROCESSING ENCRYPTED SOURCE CODE UPDATES

RELATED APPLICATION

This application claims the priority under 35 U.S.C. §119 of provisional application Ser. No. 60/632,188 filed Dec. 1, 2004.

TECHNICAL FIELD

This invention relates to programming devices and, more specifically, to a system and method for processing encrypted source code updates for a control system.

BACKGROUND

Conventional control systems generally include a circuit board and processor and are operable to control or otherwise manage a mechanically (or communicably) coupled device. For example, the controlled device may be a robot. In this example, the robot control system collects signals from both the user and on-board sensors and then processes them through code executed by the processor. In other words, this processor may execute one or more programs operable to collect the data, determine how to make the robot behave as desired based on the outputs, and sets PWM, digital, and solenoid outputs to the appropriate states. The control system may come with a default or master program that can manage at least a portion of the control system functionality. This program may occasionally be replaced, patched, or otherwise updated using source code updates.

SUMMARY

At a high level, this disclosure provides a system and method for updating a control system using an encrypted source code update. The example control system often includes a processor for managing at least a portion of the control system and flash memory communicably coupled with the processor, with the processor operable to load an encrypted update into the flash memory. In one example, a method for updating the control system would include identifying an update for a control system with the update comprising encrypted object code and the control system comprising at least a first processor. At least the first processor is then updated based on or using the identified update.

The encryption of the source code update allows for the customer or user of the control system to obtain the source code update using public or semi-public techniques, i.e. downloads from websites and such, without the underlying source code becoming public. Put another way, the encryption of the source code from the control system may allow the source code developer to maintain proprietary source code, while still easily providing updates to or patches of the source code to control system users. Another advantage of this invention may be that the developer may no longer require that the control system be shipped to him for reflashing, thereby reducing shipping fees, manpower, and other costs and time involving the update. The details of one or more embodiments of the invention are set forth in the accompanying drawings and the description below. Other features, objects, and advantages of the invention will be apparent from the description and drawings, and from the example claims. Moreover, example embodiments of the invention are included in the attachments.

DESCRIPTION OF DRAWINGS

FIG. 4 is a flow diagram illustrating an example method for generating a software code update for the control system; and FIGS. 5A-B illustrate example diagrams for loading the software code update to the control system of FIG. 2.

DETAILED DESCRIPTION

Figure 1:
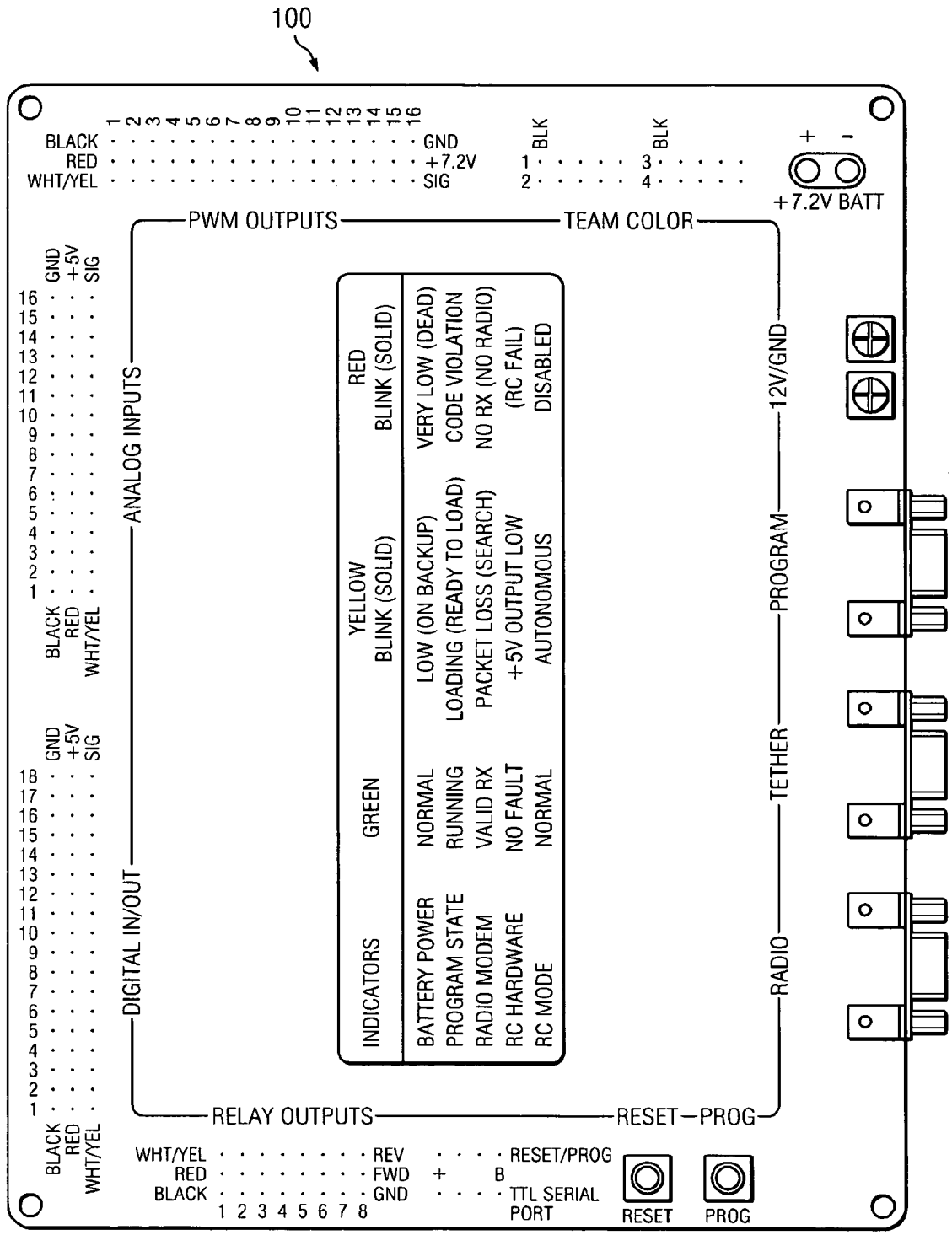
FIG. 1 is a diagram of an example control system in accordance with one embodiment of the present disclosure.

FIG. 1 is a diagram of an example control system 100 in accordance with one embodiment of the present disclosure. At a high level, control system 100 comprises any hardware and firmware and/or software operable to control a mechanical and/or electrical device. For example, in certain embodiments control system 100 may be used to control a robot. In this example, there may be two microcontrollers: a first processor that handles radio and tether communications, generates most of the PWM output signals, and oversees the general operations; and a second processor that is programmable by a user to take input data, determine what to do with outputs to make the robot behave as desired, and set PWM and Relay outputs to the appropriate states. In such an example, controller 100 may include a default program that will handle many robot control matters and, if more sophisticated control of the robot is desired, then the default program can be modified to provide the required functions of the robot. Of course, while generally described in terms of comprising a robot control system, control system 100 may be used with any mechanical, electrical, or other similar device operable to be communicably or mechanically coupled with control system 100 and controlled using various electronic commands, parameters, and such.

Returning to the example robot, control system 100 is generally operable to receive, retrieve, or otherwise collect user commands and other information, gather additional data and information from sensors on-board the robot, dynamically determine how the robot should function based on pre-defined parameters and algorithms, and instruct the robot to perform these functions. The illustrated robotic control system 100 includes four fast R/C PWM (radio controlled, pulse width modulated) outputs capable of being refreshed every 2 mSec, sixteen fast digital inputs/outputs, sixteen fast analog inputs (with perhaps 10-bit resolution), one or more fast TTL (transistor transistor level), RS232, RS485, or other compatible serial ports, two processors 130 and 135 (often C-programmable), and 1800 bytes of memory with 32 kilobytes of program space. In this example, the PWM outputs may be used to drive speed controllers and servos and/or to control a variable speed motor from a joystick axis. Moreover, each of the PWM outputs may generate a PWM signal corresponding to a specific output of a user's program or other customized code. The relay outputs are often used to drive bi-directional relay modules, to drive small motors in Full Forward, Full Reverse, or Off, and/or to turn On or Off solenoids, pumps, and lights from a joystick button. Each of the eight ports may generate two binary signals corresponding to a specific output of the user's program. The analog inputs can be used to measure various conditions on the robot and trigger automatic responses by the control program. Typically, any sensor (such as potentiometers and gyro (yaw rate) sensors) that outputs a variable 0-5V signal may be read with 10-bit resolution on these inputs. The digital I/O pins may be configured individually as either inputs or outputs in the user's program. Normally, when configured as inputs these pins accept signals of either 0 Volts or 5 Volts from sources such as switches or other external circuitry, where a 0V signal will be read as a logic 0 in the software and a 5V signal on the pin will be read as a logic 1. The most common use for digital inputs is for the connection of switches, which may be wired individually, in parallel, or in series. Further, some or all digital I/O pins can be configured as hardware interrupts.

In certain embodiments, control system 100 may also include a program button that is used to put control system 100 into a state waiting for download of a new or updated program. When this example button is pressed, the program that is currently executing will be stopped. Illustrated controller 100 may include a +12V and GND connectors that accept power from a +12V battery. The current draw is typically between 0.75 A to 1.5 A. In certain cases, the maximum voltage is +15.0V, while the minimum required voltage to maintain radio link is +7.0V. Illustrated controller 100 further includes a 7.2V battery to help ensure that if the power supply coming in from the main power input drops out or temporarily dips, controller 100 will not lose power and reset, thereby causing the program currently running to restart. For example, this can occur if the robot controller 100 and the rest of the robot share the same power supply and a high current draw (from stalled motors, for example) causes that power supply voltage to droop. In this case, the small battery connected to the battery backup receptacle typically keeps controller 100 running without resetting when the main power comes back up. The Battery Backup circuit may also supply power to the center pins of the PWM outputs which helps operate servos. Illustrated controller 100 also includes a program port, a tether port, and a radio port. In certain embodiments, i) the program port is used to change the program and port is intended to connect to a PC's serial port using a DB9 Male-Female Pin-to-Pin cable; ii) the TETHER port is intended to connect to an operator interface using a "hard" wire connection—such as a DB9 Female-Female Pin-to-Pin cable—instead of using a wireless radio link; and iii) the radio port may connect to a radio modem only using RS-422, to minimize noise interference in the communication link, or RS-232.

As mentioned above, the illustrated and described controller 100 is for example purposes only. For example, a smaller hobby controller 100 may be used with fewer input and outputs. In another example, a faster or more powerful controller 100 may be used to control more advanced robots or other devices.

Figure 2A:
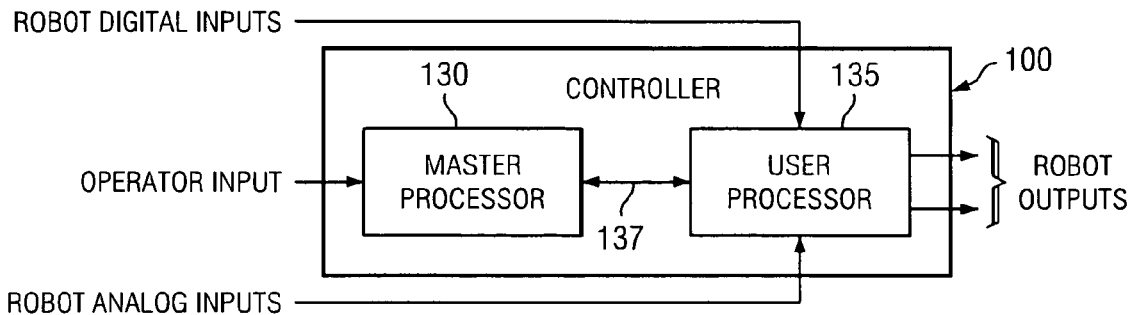
FIGS. 2A-B illustrate an example configuration and operation of a two-processor control system for a robot.
Figure 2B:
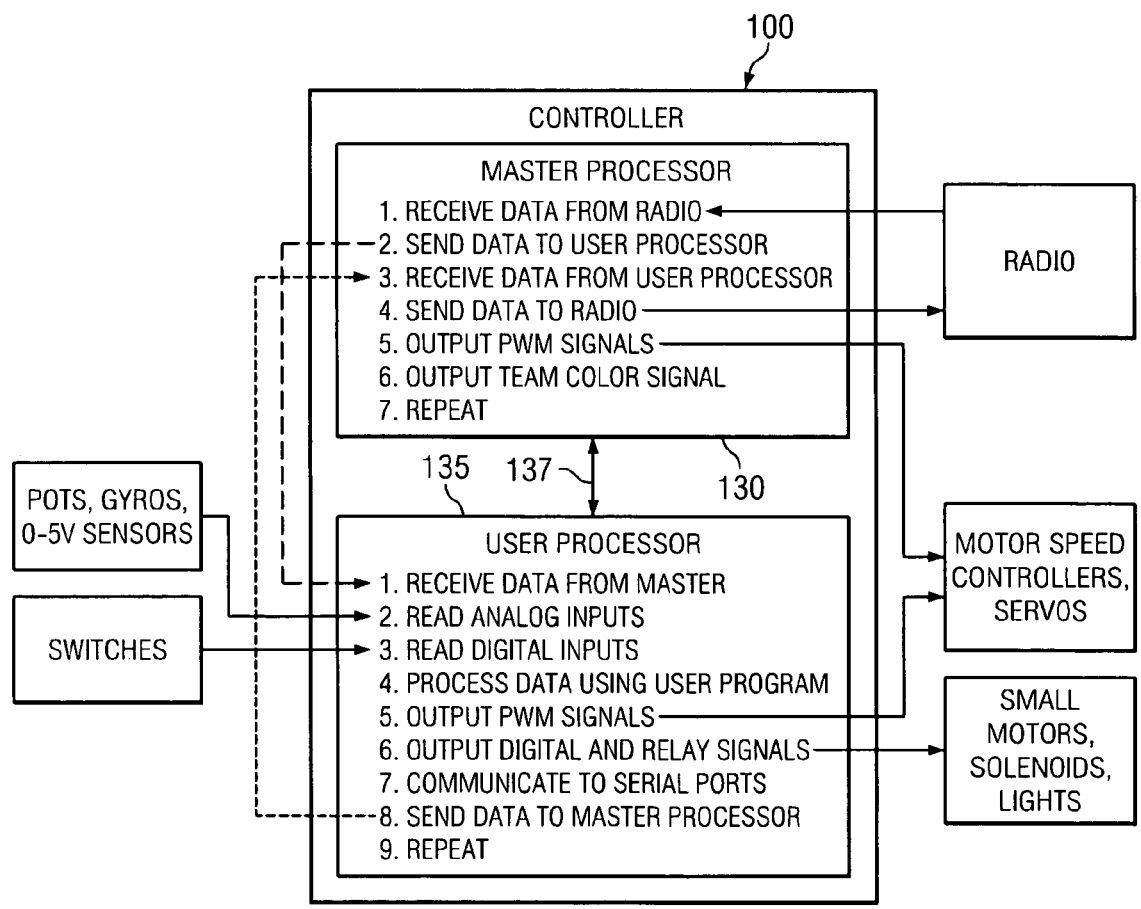

As illustrated in FIGS. 2A-B, control system 100 may comprise two processors: master processor 130 and user or slave processor 135. Processors 130 and 135 execute instructions and manipulate data to perform the operations of control system 100 and each comprise, for example, a central processing unit (CPU), a blade, an application specific integrated circuit (ASIC), a microcontroller (such as PIC18F8520), or a field-programmable gate array (FPGA). Although illustrated control system 100 includes two processors, 130 and 135 respectively, in control system 100, any number of processors (including one) may be used according to particular needs and reference to processor 130 and/or 135 is meant to include one or more processors where applicable. In the illustrated embodiment, master processor 130 is generally operable to send data to and receive data from a radio or other data communication device, communicate data with user processor 135 often via an SPI (Serial Peripheral Interface) or other bidirectional bus or hyper-transport link 137, output PWM signals, output color or LED signals, and execute other algorithms or functions using master code. Illustrated user processor 135 is generally operable to communicate data with master processor 135, read the various inputs, output PWM signals, output digital and relay signals, communicate with signal ports, and execute custom algorithms implemented or defined by user code.

The memory may include any type of memory and may take the form of volatile or non-volatile memory including, without limitation, magnetic media, optical media, random access memory (RAM), read-only memory (ROM), removable media, flash media or electrically erasable programmable read-only memory (EEPROM), or any other suitable local or remote memory component operable to store object code or other executable software in program space. Beyond the program space, the memory may also include configuration and ID space. Moreover, the memory typically includes a bootloader program that is operable to load a hex or BIN file into flash memory. In other words, the bootloader may be used to quickly download a new program, such as the source code update, into the appropriate processor. This load is typically performed in-circuit without modification to the respective circuit board. Certain bootloaders are compatible with any number of operating systems including Unix, Windows, DOS, Linux, and others, as well as non-conventional operating systems. In operation, the bootloader may receive the software update from a client computer using an RS232 serial adapter (or other similar interface), which generally converts the RS232 to TTL levels, −13V to +5V and +13V to 0V. Certain software code updates may include an extra line that reserves the top 255 bytes in memory for the bootloader. In certain embodiments, each processor in control system 100 may be communicably or electronically coupled with a subset of the memory. For example, master processor 130 may be associated with master flash memory 140 and user processor 135 may be associated with user flash memory 145. In this example, each respective memory component will typically include the respective master or user software sub-module.

Control system 100 may be coupled with any other suitable component such as, for example, a battery backup ensuring "Always On" radio communication. Control system 100 may also be communicably coupled with an operator interface. For example, the operator interface may collect data from joysticks, buttons, and other input devices controlled by human operators. This data may then be communicated via radio frequency, Bluetooth or other similar technology, or tether/serial cable to control system 100. The example operator interface may also receive and display data transmitted from control system 100, as well as transmit the data to a dashboard port. In other embodiments, control system 100 may be configured to operate in an autonomous mode without an operator interface. In this embodiment, no user input is processed and control system 100 performs according to resident software such as the control module application.

Figure 3A:
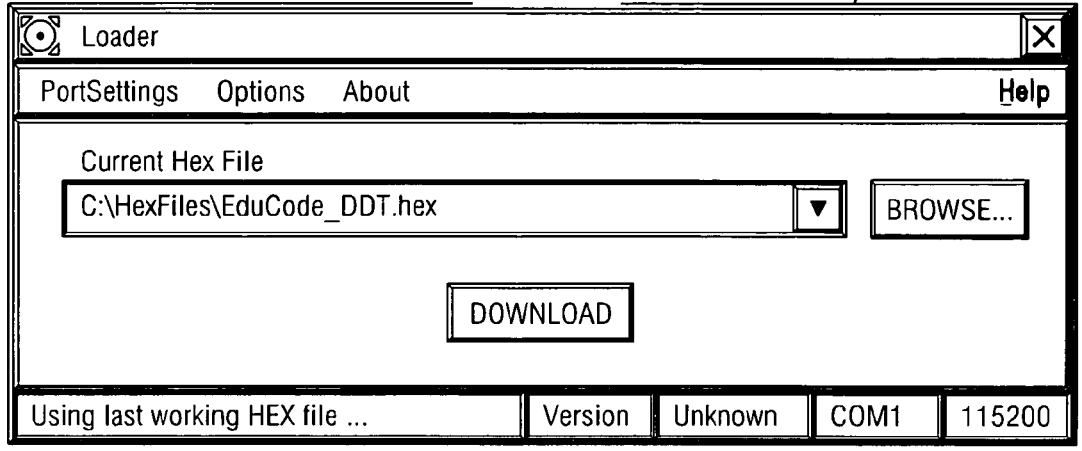
FIGS. 3A-B are diagrams including example graphical user interfaces for identifying a software update for the control system of FIG. 2.
Figure 3B:
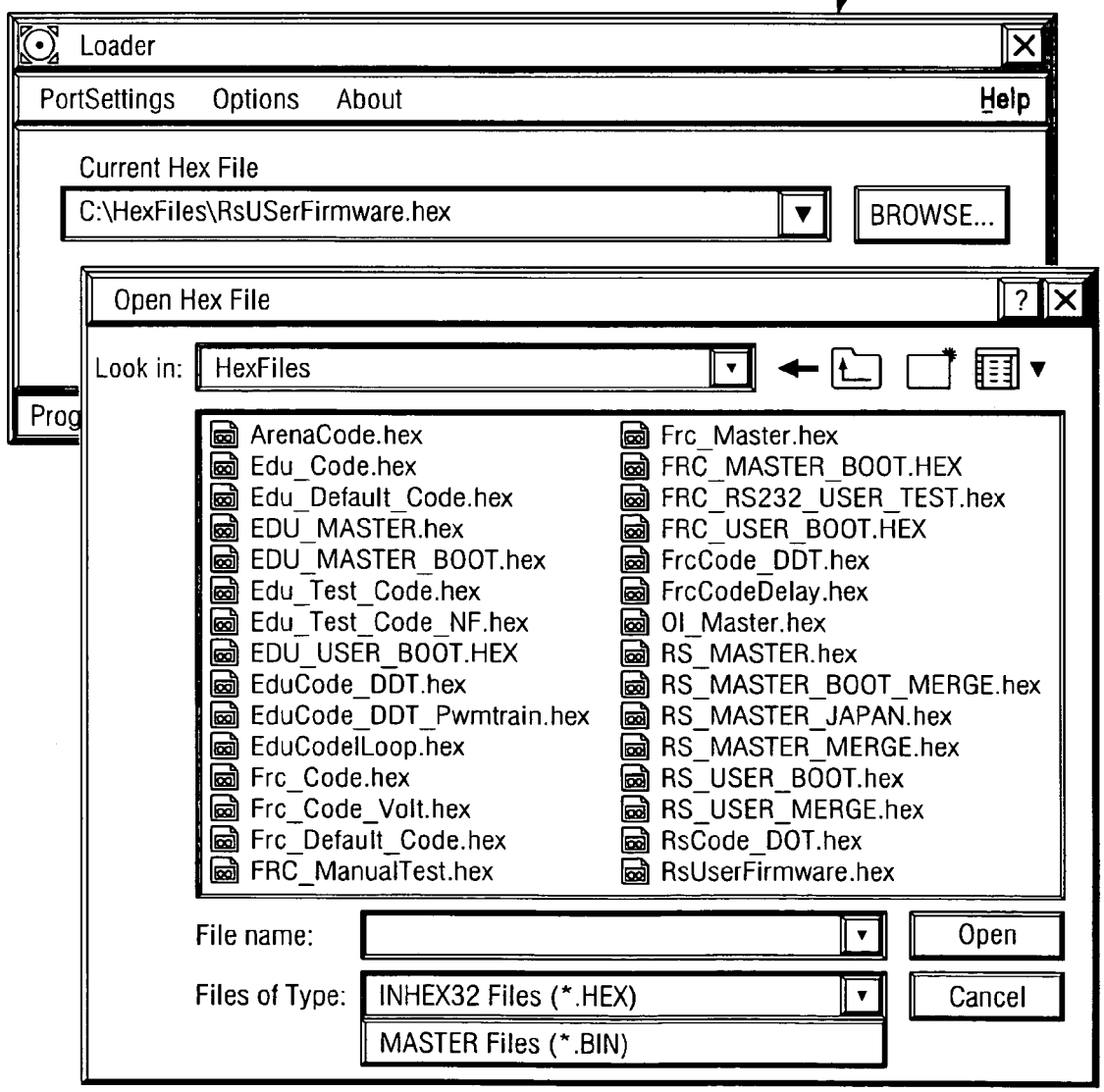

The control module application comprises any combination of firmware or software operable to manage at least a portion of control system 100 and/or the coupled device, such as the robot. For example, the control module application may comprise two sub-modules, a master module and a user-defined module, as appropriate. Each module or sub-module may be partially or completely written or described in any appropriate computer language including C, C++, Java, Visual Basic, assembler, Perl, any suitable version of 4GL, and others or any combination thereof. It will be understood that while described in terms of two sub-modules, the features and functionality performed by this application may be consolidated within a single module as well. Indeed, the control module application may comprise one of a plurality of sub-modules of a parent application or module (not illustrated). Further, the sub-modules may be collectively stored in one file or flash memory or distributed across a plurality of files or memories without departing from the scope of the disclosure. As described in more detail below, the control module application may be replaced, patched, modified, or otherwise updated using an encrypted source code update, which is often downloaded using a client as illustrated in FIGS. 3A-B.

A client is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client includes at least GUI 116 and comprises an electronic computing device operable to receive, transmit, process and store any appropriate data. It will be understood that "client," "customer," "user," and "operator" may be used interchangeably as appropriate without departing from the scope of this disclosure. Moreover, for ease of illustration, each client is described in terms of being used by one user. But this disclosure contemplates that many users may use one computer or that one user may use multiple computers to submit commands or download software updates via GUI 116. As used in this disclosure, the client is intended to encompass a personal computer, touch screen terminal, workstation, network computer, kiosk, wireless data port, wireless or wireline phone, personal data assistant (PDA), one or more processors within these or other devices, or any other suitable processing device. For example, the client may comprise a computer that includes an input device, such as a keypad, touch screen, mouse, or other device that can accept information, and an output device that conveys information associated with the operation of the robot, including digital data, visual information, or GUI 116. Both the input device and output device may include fixed or removable storage media such as a magnetic computer disk, CD-ROM, or other suitable media to both receive input from and provide output to the user through the display, namely GUI 116.

GUI 116 comprises a graphical user interface operable to allow the user of the client to download software updates or perform any other data-sharing or viewing for any suitable purpose. Generally, GUI 116 provides the user of the client with an efficient and user-friendly presentation of data provided by a distributor of control system software, software updates, and such. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information and efficiently presents the results to the user. Generally, GUI 116 may be described in terms of a web browser (e.g., Microsoft Internet Explorer or Netscape Navigator) operable to receive and communicate the appropriate HTML or XML responses using any suitable network. GUI 116 may comprise a plurality of customizable frames or views having interactive fields, pull-down lists, and buttons operated by the user. In one embodiment, GUI 116 receives commands from the user of the client via one of the input devices.

FIG. 4 is a flow diagram illustrating an example method 400 for generating a software code update for one or more control systems. Such a method may be implemented by a controller provider, a third party software or service provider, a support group, or other entity In this example computer-implementable method 400, a source code update is generated and encrypted for use by one or more control systems 100. While method 400 describes generating particular formats of the update, it will be understood that the update may be in any format or formats as appropriate. Example method 400 begins at step 402, where a source code update is identified. As described above, source code update may be a new application, a replacement release or version, an upgrade, a cyclical release or a patch, or any other software that is operable to be used by at least part of control system 100. As described more fully above, this source code update may be written or described in any suitable computer language such as C. Next, at step 404, the source code is compiled into object code. This object code is then used to generate an S-record format, or Intel hex 32 standard format, at step 406. The S-record code is then encrypted using, for example, a multi-keyed encryption algorithm at step 408. In this example, the update may be encrypted by applying a logical AND or XOR to various memory addresses and the particular component blocks of the update. But, of course, any particular encryption algorithm, method, or technique may be used without departing from the scope of the disclosure. This encryption process at least partially generates a BIN file, for example, at step 410. Once the BIN file is suitably created, it is communicated to one or more clients using any appropriate technique at step 412. For example, the BIN may be published to a website that allows numerous clients or customers to request, download, and install the update to their respective one or more control systems 100. In another example, the encrypted update may be emailed or otherwise distributed to clients using a distribution list or other similar automatic distribution technique. In yet another example, the source code update may be burned to CD, DVD, or other media and shipped to particular customers. Such distribution may occur using these examples or via any other technique. Indeed, the encrypted update may be communicated directly to the control system 100 using any channel or medium.

Figure 5B:
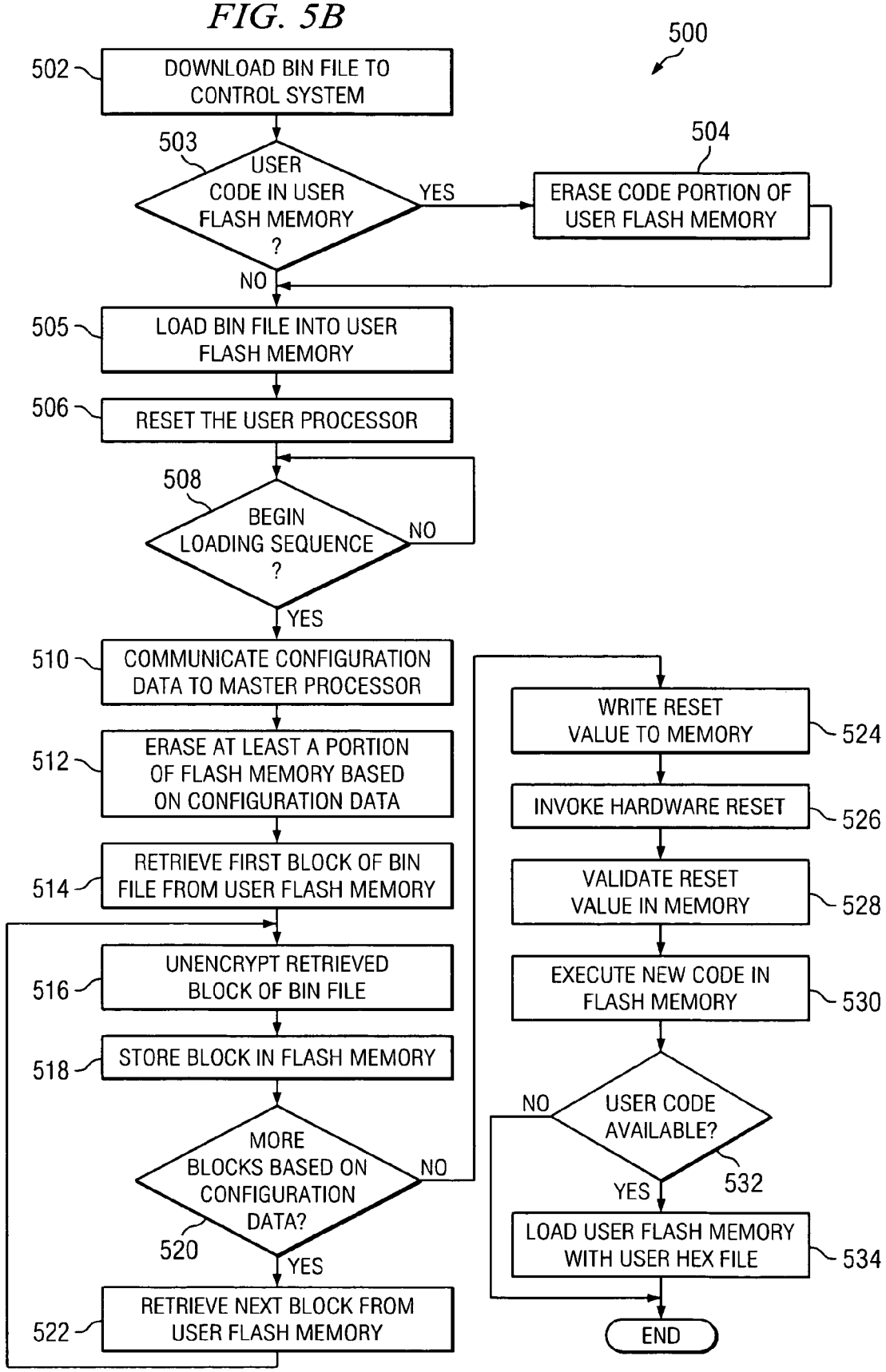

FIGS. 5A-B illustrate example flow diagrams for loading the software code update to the control system of FIG. 2. In the illustrated embodiments, FIG. 5A illustrates a high-level data flow diagram and FIG. 5B illustrates a method 500 for distributing and processing an encrypted source code update for control system 100. In this example, computer-implementable method 500 generally describes loading the encrypted source code update into user memory, decrypting the source code update into the master memory, and flashing at least a portion of the master memory with the updated source code. For purposes of this example, control system 100 is described as including two processors, master process 130 and user processor 135, that each have flash memory operable to load and execute code including numerous blocks. However, it should be understood that these are only examples of the number and types of processors and code that might be executed by the processors.

Method 500 begins at step 502 when the encrypted BIN file is downloaded or otherwise communicated to control system 100, typically via the client and an RS232 or other similar connection. Master processor 130 determines if the program space in user flash memory 145 includes user code at decisional step 503. If it does, then the program space in user flash memory 145 may be erased at step 504. Next, the downloaded BIN file is loaded into user flash memory 145 at step 505, typically using a bootloader preloaded in user flash memory 145. At step 506, user processor 135 is reset. Next, it is determined at decisional step 508 whether to begin the loading sequence. Once it is determined that the loading sequence should begin, the configuration data is communicated from user processor 135 to master processor 130 at step 510. At step 512, master processor 130 erases at least a portion of master flash memory 140 associated with the source code update based on the configuration data.

Once the appropriate portions of master flash memory 140 have been erased, master processor 130 retrieves the first block of the updated BIN file from user flash memory 145 at step 514. This retrieved block of the BIN file is then decrypted at step 516 using any appropriate encryption algorithm. For example, master processor 130 may use a multikeyed encryption algorithm, typically the same algorithm used to initially encrypt the BIN file. At step 518, is unencrypted block is in stored in master flash memory 140 at step 518. Based on the configuration data, master processor 130 determines if there are more blocks in the updated BIN file at decisional step 520. If there are more blocks, then master processor 130 retrieves the next block from user flash memory 145 at step 522 and processing returns to step 516.

Once an appropriate portion of the updated BIN file has been received into master flash memory 140, master processor 130 writes a reset value to master flash memory 140 at step 524. Next, a hardware reset is invoked at step 526. After the hardware is rebooted, the reset value in master flash memory 140 is validated at step 528. If it is validated, the master processor 130 executes the new code in master flash memory 140 at step 530. Next, at decisional step 532, it is determined if there is user code available for loading into user flash memory 145. If it is available, then this user code, typically in a BIN or hex format, is loaded into user flash memory 145 at step 534.

The preceding flowcharts and accompanying descriptions illustrate example methods 400 and 500, but numerous other similar or distinct methods could be employed or implemented as well. In short, control system 100 contemplates using or executing any suitable technique or process for performing these and other tasks. In particular, any method of operation suitable for use with any of the embodiments of control system 100 described herein is contemplated within this disclosure. Accordingly, many of the steps in this flowchart may take place simultaneously and/or in different orders than as shown. Moreover, control system 100 may use methods or algorithms with additional steps, fewer steps, and/or different steps, so long as the methods are consistent with any of the techniques for defining and implementing a management component described or suggested by this disclosure.

A number of embodiments of the invention have been described. Nevertheless, it will be understood that various modifications may be made without departing from the spirit and scope of the invention. For example, control system 100 may include one master processor 130 that performs the retrieval, decryption, and loading of the encrypted source code update. Accordingly, other embodiments are within the scope of the following claims.

What is claimed is:

1. A method for updating a control system comprising:
 identifying an update for a robot control system, the update comprising encrypted object code and the control system comprising at least a first processor;
 loading the encrypted update into second memory associated with a second processor;
 decrypting the update into master memory from the second memory, wherein decrypting the update into master memory from the second memory includes:
  communicating a first portion of the encrypted update to the master memory from the second memory; and
  decrypting the first portion of the encrypted update;
 communicating configuration data from the second processor to the first processor;
 erasing at least a portion of the master memory, the portion associated with the update based on the configuration data;
 flashing the portion of the master memory with the updated code; and
 updating the first processor based at least in part on the flashed portion of the master memory.

2. The method of claim 1, wherein identifying the update comprises receiving an automatically generated notification that the update is available.

3. The method of claim 2, further comprising receiving the identified update from a client, the client capable of downloading the encrypted update from a third party.

4. The method of claim 1, further comprising erasing the second memory prior to loading the encrypted update.

5. The method of claim 1, further comprising resetting the second processor after loading the encrypted update into the second memory.

6. The method of claim 1, further comprising:
 communicating a second portion of the encrypted update to the master memory from the second memory; and
 decrypting the second portion of the encrypted update.

7. The method of claim 6, each portion of the encrypted update comprising one block of memory.

8. The method of claim 6, further comprising:
 writing a reset value to the master memory; and
 invoking a reset of the first processor using the master memory.

9. The method of claim 1, further comprising loading second memory with customized code after decrypting the update into master memory from the second memory.

10. The method of claim 1, wherein decrypting the update into the master memory comprises decrypting the update using a multi-key algorithm.

11. A control system comprising:
 a first processor for managing at least a portion of a robot control system;
 flash master memory communicably coupled with the first processor;
 a second processor;
 a second memory communicably coupled with the second processor; and
 wherein the control system loads an encrypted update into the second memory, decrypts the update into the master memory from the second memory using the second processor by communicating a first portion of the encrypted update to the master memory from the second memory and decrypting the first portion of the encrypted update, communicates configuration data from the second processor to the first processor, erases at least a portion of the master flash memory, with the portion associated with the update based on the configuration data, and flashes at least a portion of the master memory with the updated code for use by the first processor.

12. The control system of claim 11, the control system communicably coupled to a client and the update received from the client, with the client capable of downloading the encrypted update from a third party.

13. The control system of claim 11, further operable to erase the second memory prior to loading the encrypted update.

14. The control system of claim 11, further operable to reset the second processor after loading the encrypted update into the second memory.

15. The control system of claim 11, further operable to:
communicate a second portion of the encrypted update to the master memory from the second memory; and
decrypt the second portion of the encrypted update.

16. The control system of claim 15, each portion of the encrypted update comprising one block of memory.

17. The control system of claim 16, further operable to:
write reset value to the master memory; and
invoke a reset of the first processor using the master memory.

18. The control system of claim 17, further operable to load the second memory with customized code.

19. The control system of claim 17, wherein the one control system operable to decrypt the update into master memory comprises the control system operable to decrypt the update using a multi-key algorithm.

20. A control system loader comprising computer readable instructions, embodied in a non-transitory computer-readable storage medium, operable when executed to:
identify an update for a robot control system, the update comprising encrypted object code and the control system comprising at least a first processor;
load the encrypted update into second memory associated with a second processor;
decrypt the update into master memory from the second memory;
load the second memory with customized code after decrypting the update into master memory from the second memory;
communicate configuration data from the second processor to the first processor;
erase at least a portion of the master memory prior to the decryption, the portion associated with the update based on the configuration data;
flash at least the portion of the master memory with the updated code;
update the first processor based at least in part on the flashed portion of the master memory;
write a reset value to the master memory; and
invoke a reset of the first processor using the master memory.

21. A method for updating a control system comprising:
identifying an update for a robot control system, the update comprising encrypted object code and the control system comprising at least a first processor;
loading the encrypted update into second memory associated with a second processor;
decrypting the update into master memory from the second memory;
loading the second memory with customized code after decrypting the update into the master memory from the second memory;
communicating configuration data from the second processor to the first processor;
erasing at least a portion of the master memory, the portion associated with the update based on the configuration data;
flashing the portion of the master memory with the updated code; and
updating the first processor based at least in part on the flashed portion of the master memory.

22. A control system comprising:
a first processor for managing a least a portion of a robot control system;
flash master memory communicably coupled with the first processor;
a second processor;
a second memory communicably coupled with the second processor; and
wherein the control system loads an encrypted update into the second memory, decrypts the update into the master memory from the second memory using the second processor, loads the second memory with customized code after decrypting the update into the master memory from the second memory, communicates configuration data from the second processor to the first processor, erases at least a portion of the master flash memory, with the portion associated with the update based on the configuration data, and flashes at least a portion of the master memory with the updated code for use by the first processor.

\* \* \* \* \*

UNITED STATES PATENT AND TRADEMARK OFFICE
CERTIFICATE OF CORRECTION

PATENT NO.       : 7,904,706 B2                                           Page 1 of 1
APPLICATION NO.  : 11/290158
DATED            : March 8, 2011
INVENTOR(S)      : Mark J. Lambert It is certified that error appears in the above-identified patent and that said Letters Patent is hereby corrected as shown below:

Col. 8, Line 22,
Claim 22, delete "a least" and insert --at least-- therefor.

Signed and Sealed this
First Day of November, 2011

David J. Kappos
*Director of the United States Patent and Trademark Office*